United States Patent [19]

Kobayashi et al.

[11] 4,336,517
[45] Jun. 22, 1982

[54] REVOLUTION DETECTING DEVICE

[75] Inventors: Kyoji Kobayashi, Chigasaki; Takeo Furuya, Yokohama, both of Japan

[73] Assignee: Jidosha Denki Kogyo Kabushiki Kaisha, Yokohama, Japan

[21] Appl. No.: 74,625

[22] Filed: Sep. 12, 1979

[30] Foreign Application Priority Data

Sep. 21, 1978 [JP] Japan .......................... 53-128616[U]
Sep. 21, 1978 [JP] Japan .......................... 53-128617[U]
Jun. 26, 1979 [JP] Japan ............................ 54-86633[U]

[51] Int. Cl.³ ..................... H01H 9/00; H02K 11/00
[52] U.S. Cl. ................................ 335/205; 73/519; 74/12; 310/68 B
[58] Field of Search ...................... 322/31; 310/68 B; 335/205; 73/488, 493, 494, 519; 74/12

[56] References Cited

U.S. PATENT DOCUMENTS

| | | | |
|---|---|---|---|
| 3,961,604 | 6/1976 | Shimrony | 335/205 X |
| 4,049,986 | 9/1977 | Kreuz | 335/205 X |
| 4,186,362 | 1/1980 | Kondo et al. | 335/205 |
| 4,246,790 | 1/1981 | Nichols | 73/519 X |

*Primary Examiner*—R. J. Hickey
*Attorney, Agent, or Firm*—Blanchard, Flynn, Thiel, Boutell & Tanis

[57] ABSTRACT

A device for detecting a revolution number of a connection shaft is disclosed. The device comprises a permanent magnet body attached to the connection shaft and a pulse generating means disposed apart from the magnet body, wherein the pulse generating means is arranged in a housing isolated from a casing for the connection shaft.

7 Claims, 11 Drawing Figures

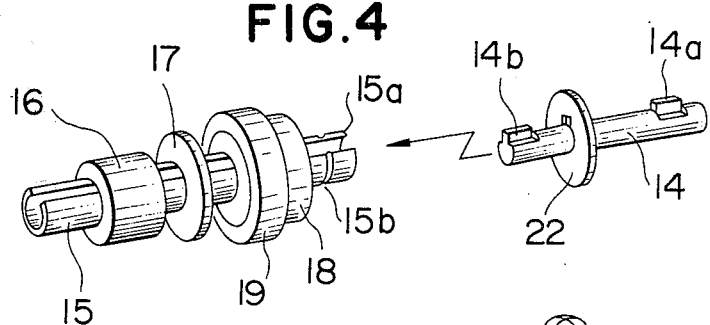
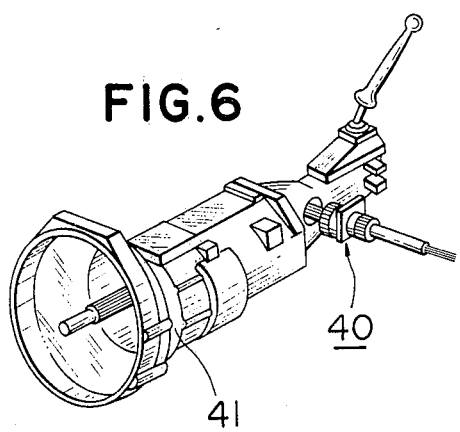
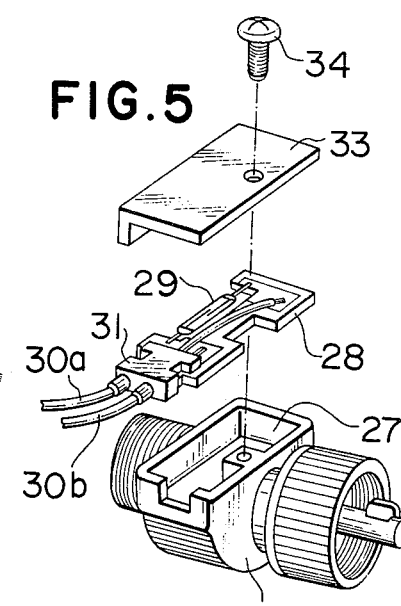
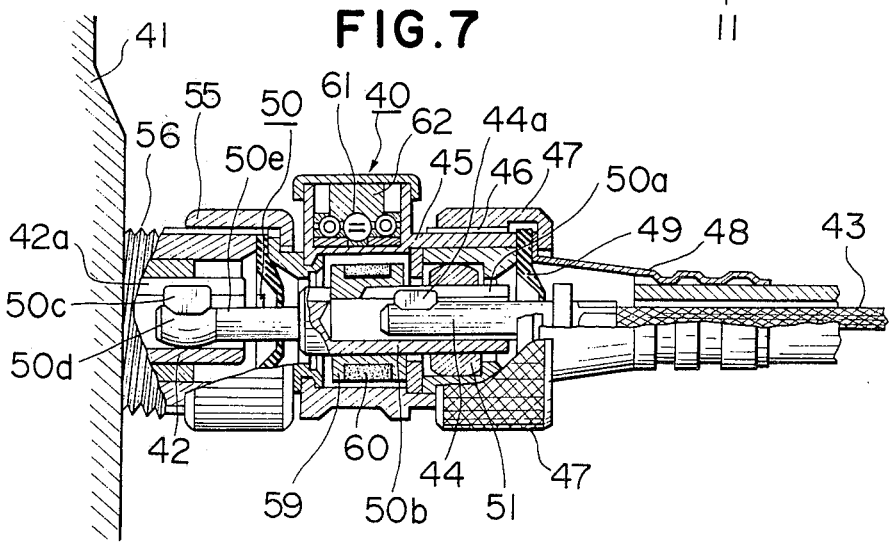

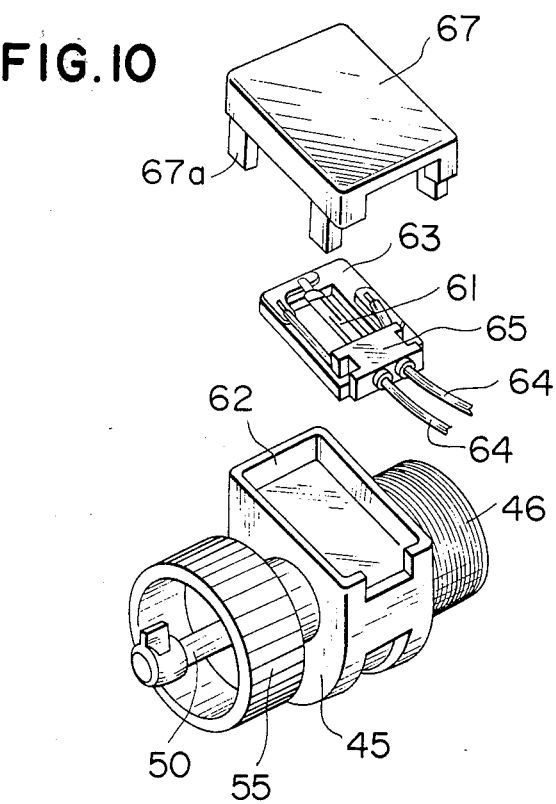
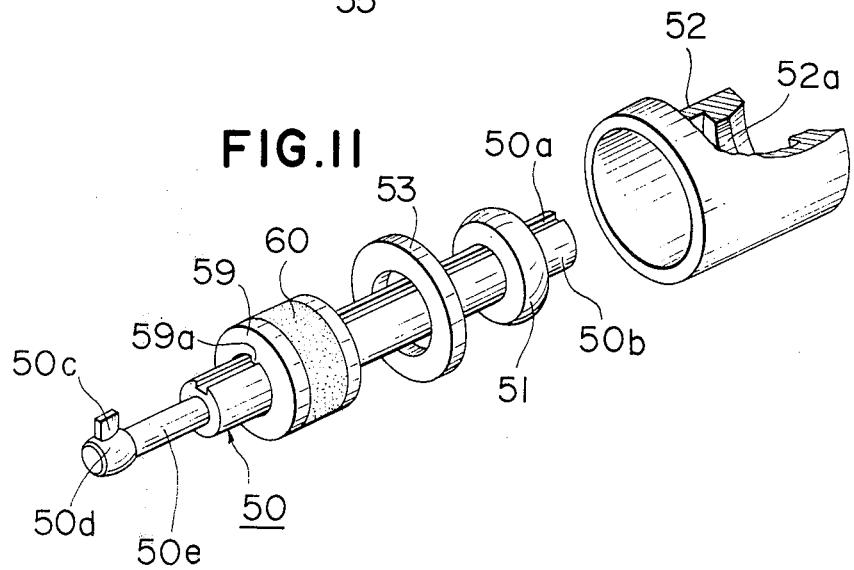

REVOLUTION DETECTING DEVICE

FIELD OF THE INVENTION

This invention relates to a device for detecting the number of revolutions of a connection shaft, comprising a permanent magnet body attached to the connection shaft and a pulse generating means disposed apart from the magnet body.

BACKGROUND OF THE INVENTION

In general, the revolution detecting device of this type is widely used in ordinary industrial machines, agricultural machines and automobiles and the like. Particularity, the revolution detecting device is installed between a transmission and a speedometer cable or near a speedometer in the automobiles as shown in FIG. 1, wherein numeral 1 is a transmission, numeral 2 is a middle connection shaft, numeral 3 is a coupling housing the middle connection shaft therein, numeral 4 is a revolution detecting device having a structure as mentioned below, and numeral 5 is a speedometer cable.

The revolution detecting device 4 comprises a connection shaft 6 rotatably supported by a bearing 7, a permanent magnet body 8 fixed to the connection shaft 6 and a pulse generating means 9 such as a reed switch or the like disposed apart from the magnet body 8. In the conventional revolution detecting device 4 as shown in FIG. 1, the magnet body 8 and the pulse generating means 9 are housed in the same enclosure, so that if foreign matters such as water, dirt and the like penetrate from joint parts between the device 4 and the transmission 1 and speedometer cable 5 or from the inside of the speedometer cable 5 into the inside of the device 4, a short circuit is frequently generated by electrolytic corrosion. Further, the pulse generating means 9 is directly attached to the inner wall of the revolution detecting device 4, so that when a reed switch is used as the pulse generating means 9, there is a problem relating to a vibration resistant property.

The connection shaft 6 is connectable to a cylindrical rotation shaft 1a of the transmission 1 on one hand and to a rotational shaft 5a in the speedometer cable 5 on the other hand. However, when a fitting part 1b of the transmission 1 having male screw threads at its outer periphery is screwed to a fitting part 4a of the device 4 having female screw threads at its inner periphery, eccentricity is apt to be caused between the cylindrical rotation shaft 1a and the connection shaft 6 and hence mechanical loss becomes larger. Therefore, the middle connection shaft 2 capable of absorbing the eccentricity and the coupling 3 housing the middle connection shaft 2 therein are arranged between the rotation shaft 1a and the connection shaft 6. As a result, the number of the parts to be used increases unnecessarily, so that the number of production steps and the production cost increase.

Furthermore, the parts fall down in the assembly operation or the time required for the assembly becomes longer. Moreover, even when using the middle connection shaft, the amount of eccentricity is not yet acceptable. Therefore, the difference between the outer diameter of the middle connection shaft and the inner diameter of the rotation shaft is made large in order to enlarge the acceptable degree of eccentricity. In the latter case, however, the eccentricities of both the shafts themselves become larger and hence the transmission of revolution is not performed smoothly.

It is, therefore, an object of the invention to solve the above mentioned drawbacks of the prior art and to provide a device for detecting the number of revolutions of a connection shaft, which has an excellent vibration resistance and can operate without troubles even when harmful substances such as water, dirt and the like penetrate into the inside of the device.

It is another object of the invention to provide a device for detecting the number of revolutions of a connection shaft, which is simple to assemble and has a structure capable of preventing eccentricity between a rotation shaft and a connection shaft.

According to a first aspect of the invention, there is provided a device for detecting the number of revolutions of a connection shaft, comprising a permanent magnet body attached to the connection shaft and a pulse generating means disposed apart from the magnet body, characterized in that the pulse generating means is arranged in a housing isolated from a casing for the connection shaft carrying the magnet body. In preferred embodiment, an insulating resin fills the housing.

According to a second aspect of the invention, the connection shaft is constructed of a first connection shaft having a radially extended protrusion and a second connection shaft having a cylindrical shape capable of receiving the first connection shaft therein and having an axially extending groove capable of engaging with the protrusion, and further provided with a stopper for controlling the depth of the first connection shaft to be inserted in the second connection shaft and a locking member for preventing the slipping out of both the shafts.

According to a third aspect of the invention, an end of the connection shaft is formed of a cylindrical engaging part capable of receiving therein a rotation conducting shaft with a radially extended protrusion and having an axially extended groove capable of engaging with the protrusion, while a convex curved part having a radially extended protrusion is formed on the other end of the connection shaft, and the cylindrical engaging part is supported by a bearing through a spherical member so as to tilt the connection shaft at the supporting portion of the bearing as a fulcrum, thereby absorbing eccentricity between a rotation output shaft and a rotation conducting shaft which are connected to opposite ends of the connection shaft.

BRIEF DESCRIPTION OF THE DRAWINGS

The invention will now be described in greater detail with reference to the accompanying drawings, wherein;

FIG. 4 is an exploded perspective view of an embodiment of the connection shaft in the revolution detecting device according to the invention;

FIG. 5 is a partly exploded perspective view of the revolution detecting device shown in FIG. 2;

FIGS. 6 and 7 are a perspective view and a longitudinally cross sectional view, respectively of another embodiment of the revolution detecting device according to the invention attached to a transmission for an automobile;

FIG. 10 is an exploded perspective view illustrating the assembled state of a reed switch according to the invention; and FIG. 11 is a developed perspective view of another embodiment of the connection shaft in the revolution detecting device according to the invention.

DETAILED DESCRIPTION

Figure 1:
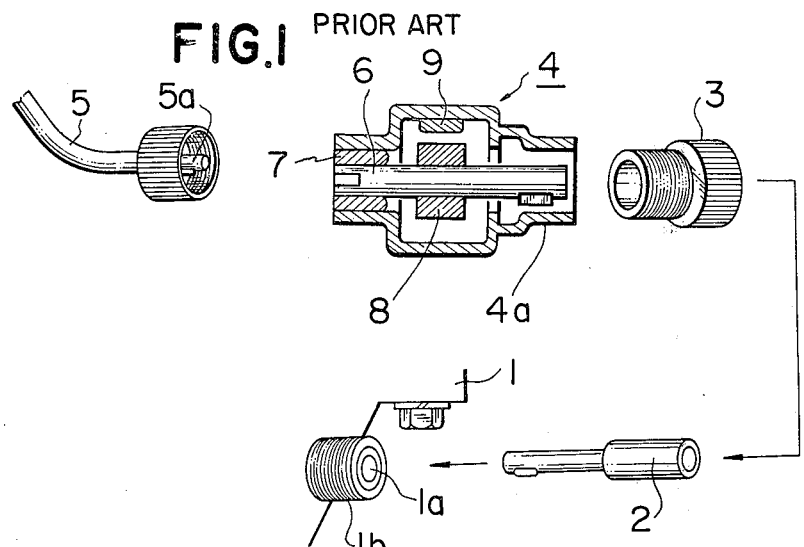
FIG. 1 is an exploded diagrammatical view illustrating the assembled state of the conventional revolution detecting device as mentioned above.

In FIGS. 2–5 is shown an embodiment of the revolution detecting device according to the invention.

A casing 11 has substantially a cylindrical shape. To an end of the casing 11 is secured a flanged cylindrical member 12, while a bearing 13 is interposed inside the other end portion of the casing 11. In an inner space 11a of the casing 11 is housed a first connection shaft 14 at the position of the cylindrical member 12. On both ends of the first connection shaft 14 are provided radially extended protrusions 14a, 14b, respectively. The protrusion 14a is connectable to a cylindrical rotation shaft of, for example, a transmission (not shown) for a motor while, the other protrusion 14b is engaged with an axially extended groove 15a formed in an end of a second cylindrical connection shaft 15 capable of passing rotation of the first connection shaft 14 therethrough. The other end side of the connection shaft 15 is connectable to a rotation shaft of, for example, a speedometer cable. Thus, the rotation of the transmission can be transferred to the speedometer cable through the first and second connection shafts 14 and 15 arranged in the inner space 11a of the casing 11.

The second connection shaft 15 is supported by the bearing 13 through a sleeve 16 fitting the shaft 15 therein. Further, a non-magnetic plate 17 and a non-magnetic cylinder 18 are fitted in the second connection shaft 15 at its end portion opposing the end portion supported by the bearing. To the outer periphery of the non-magnetic cylinder 18 is fixed at least one permanent magnet body 19 having S-N magnetic poles.

On the inner periphery of the non-magnetic cylinder 18 is provided a stopper 20 projecting in the groove 15a of the second connection shaft 15 to control the depth of entry of the first connection shaft 14 into the second connection shaft 15. Further, a locking member 21 for preventing the slipping out of the first connection shaft 14 is fitted to a circumferential groove 15b formed at the end portion of the second connection shaft 15 facing the first connection shaft 14.

Thus, the possible range of absorbing the eccentricity of the first connection shaft 14 is determined by the difference between the outer diameter of the first connection shaft 14 and the inner diameter of the second connection shaft 15 and the entry depth of the first connection shaft 14. That is, when these dimensional values are optionally determined, even if relatively large eccentricity is caused at the protrusion 14a of the first connection shaft 14, such an eccentricity is absorbed at the end portion of the second connection shaft 15 near the locking member 21, so that smooth rotation can be obtained.

Figure 2:
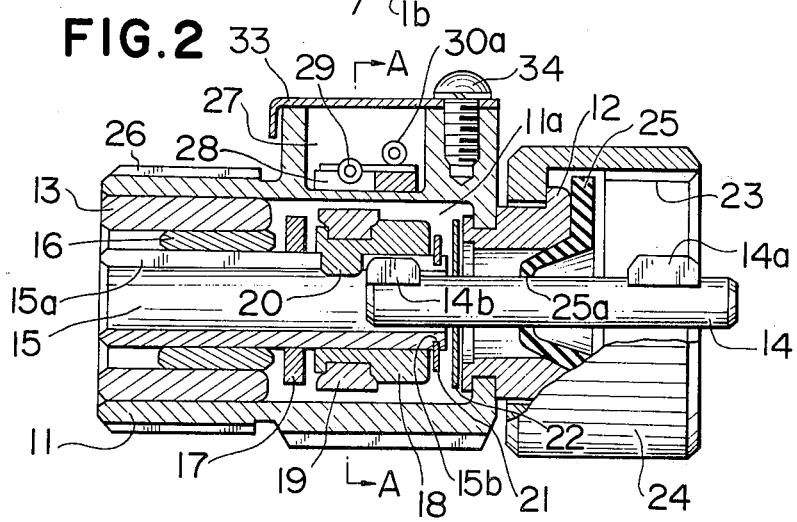
FIG. 2 is a longitudinally cross sectional view of an embodiment of the revolution detecting device according to the invention.
Figure 3:
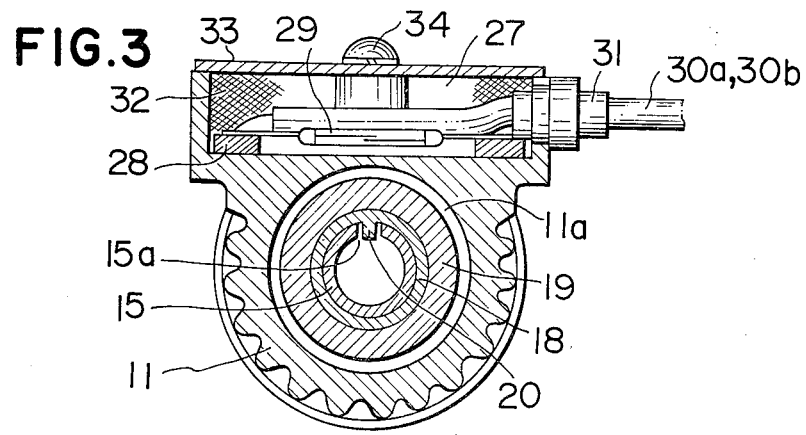
FIG. 3 is a cross sectional view taken along the line A—A of FIG. 2.
Figure 8:
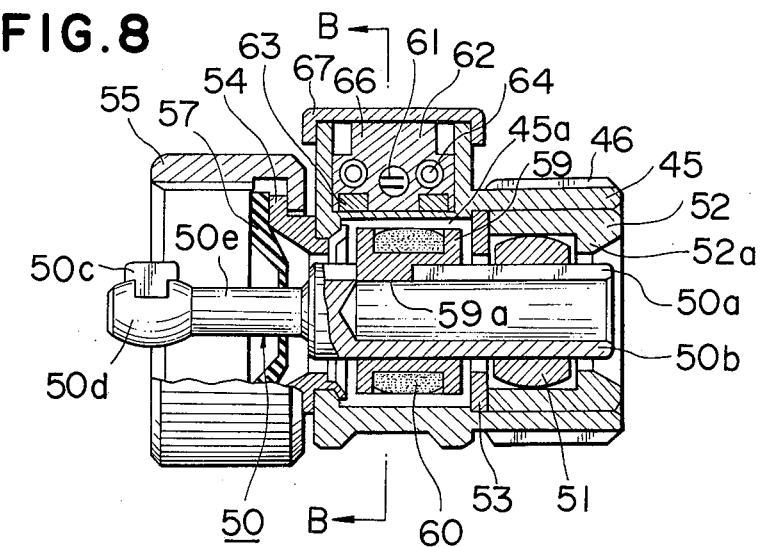
FIG. 8 is a longitudinally cross sectional view of the revolution detecting device shown in FIG. 7.
Figure 9:
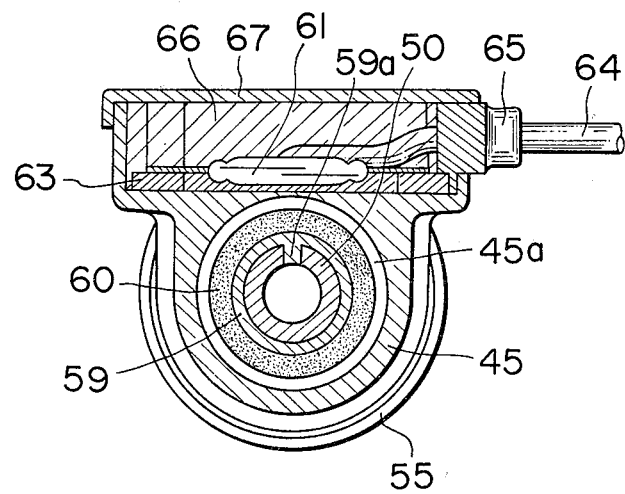
FIG. 9 is a cross sectional view taken along the line B—B of FIG. 8.

Slipping out of the second connection shaft 15 is prevented by contacting of the non-magnetic plate 17 fixed to the shaft 15 with the edge surface of the bearing 13 in the left-hand direction of FIG. 2 and in the right-hand direction of FIG. 2 by contacting of the edge surface of the second connection shaft 15 with the edge surface of the flanged cylindrical member 12 through a washer 22 received on the first connection shaft 14.

To the flanged cylindrical member 12 is rotatably engaged a socket nut 24 provided at its inner periphery with female screw threads 23, which is screwed onto male screw threads formed on an outer periphery of a fitting member for the transmission (not shown), whereby the revolution detecting device body can be fixed to the transmission.

On a substantially middle portion of the first connection shaft 14 is provided a resilient packing 25 having a lip part 25a for preventing the penetration of harmful substances such as water, dirt and the like from the socket nut 24 and the transmission side to the inside of the revolution detecting device body. On the other hand, male screw threads 26 are formed on the outer periphery of the end portion of the casing 11 opposite to the socket nut 24, whereby the casing 11 can be screwed into a socket nut provided with female screw threads in the speedometer cable (not shown).

Thus, by using the socket nut for the connection between the revolution detecting device and the transmission or speedometer cable, rotation of the revolution detecting device itself can be prevented during the assembling operation, and as a result, a lead wire extending from the revolution detecting device to the exterior does not wind round the device body or snap.

On the outer peripheral part of the casing 11 is disposed a housing 27 open at its upper surface, and isolated from the inner space 11a of the casing 11. Inside the housing 27 is disposed a pulse generating means 29 such as reed switch, Hall element or the like on a substrate 28. The pulse generating means 29 constitutes a revolution detecting means together with the magnet body 19 attached to the second connection shaft 15.

When the reed switch is used as the pulse generating means 29, the envelope of the reed switch is made from a glass tube, so that it is apt to be broken. Therefore, the envelope is fitted to the substrate 28 so as to eliminate potential stress of the reed switch and the like, while lead wires 30a, 30b extending from both ends of the reed switch are also attached to the substrate 28. These lead wires 30a, 30b are guided from the revolution detecting device body through a grommet 31 to the exterior, whereby a pulse signal is transferred to a revolution indicating part or the like.

After the substrate 28, pulse generating means 29, lead wires 30a, 30b, grommet 31 and the like are disposed inside the housing 27, the housing 27 is filled with an insulating resin 32 so as to improve waterproofness and vibration resistance. Further, a cover 33 is fixed to the open part of the housing 27 by means of a bolt 34 for protecting the resin 32 and the pulse generating means 29 such as a reed switch, Hall element or the like.

In the revolution detecting device as mentioned above, even if eccentricity is caused between the motor side (for instance, transmission side) and the revolution detecting device, it can easily be absorbed by both the first and second connection shafts 14 and 15. Further, the waterproofness and vibration resistance of the portion including the pulse generating means are considerably improved.

In FIGS. 6–11 is shown another embodiment of the revolution detecting device according to the invention. As shown in FIGS. 6 and 7, a revolution detecting device 40 is fixed to a wall surface of a transmission 41 for an automobile so as to take out the number of revolutions from a connecting part between a rotation output shaft 42 of the transmission 41 and a rotation conducting shaft 44 of a speedometer cable 43.

The revolution detecting device 40 comprises a substantially cylindrical casing 45 as shown in FIGS. 8–11. On an outer peripheral part at an end of the casing 45 is formed male screw threads 46, to which is screwed a fitting nut 47 of the speedometer cable 43. In this case, a packing 49 is interposed between the end of the casing 45 and a cap 48 fitted to an end of the speedometer cable 43.

Inside the casing 45 is arranged a connection shaft 50, an end of which is formed into a cylindrical engaging part 50b capable of receiving the rotation conducting shaft 44 with a radially extended protrusion 44a and provided with an axially extended groove 50a engageable with the protrusion 44a. The cylindrical engaging part 50b is supported through a spherical member 51 by a bearing 52 received in the casing 45. The bearing 52 has a collar 52a for preventing the slipping out of the spherical member 51, while a stopper plate 53 is sandwiched between the end of the bearing 52 in the receiving direction and the casing 45 to control the position of spherical member 51. Therefore, the connection shaft 50 is tiltably moved around the spherical member 51, so that the spherical member 51 acts as a so-called self-aligning bearing.

On the other hand, the other end of the connection shaft 50 is formed into a convex curved part 50d having a radially extended protrusion 50c, which is received in the rotation output shaft 42. In this case, the cylindrical rotation output shaft 42 has an axially extended groove 42a capable of engaging with the protrusion 50c to transmit rotation. Thus, between the connection shaft 50 and the rotation output shaft vibration in the radial direction is hardly caused due to the presence of the convex curved part 50d at the other end of the connection shaft 50. Furthermore, the body 50e of the connection shaft 50 can be thinned between the convex curved part 50d and the engaging part 50b, so that the connection shaft body 50e does not contact the open end of the rotation output shaft 42 even if the connection shaft 50 is tilted a large amount and as a result, the mechanical loss is little and the transmission of rotation is smooth. Moreover, it is desirable to make the axial length of the convex curved part 50d as short as possible.

In the other end side of the casing 45 is received a flanged cylindrical member 54, to which is rotatably engaged a socket nut 55. The slocket nut 55 is screwed onto male screw threads 56 fixed to the wall part of the transmission 41 to thereby perform the securing of the revolution detecting device 40. In this case, a packing 57 is interposed between the end of the rotation output shaft 42 and the cylindrical member 54 to prevent the penetration of water, dirt or the like.

On the connection shaft 50 is fitted a non-magnetic cylindrical member 59, to which are attached permanent magnet bodies 60 having S-N magnetic poles at positions in the circumferential direction. Further, a protrusion 59a capable of engaging with the groove 50a is provided on the inner peripheral side of the non-magnetic cylindrical member 59 to prevent slippage with respect to connection shaft 50.

On the casing 45 is provided a housing 62 for a reed switch 61 at a position corresponding to the magnet body 60 so as to interrupt the reed switch 61 by the rotation of the magnet body 60. In this case, the housing 62 is isolated from an inner space 45a of the casing 45 in such a manner that even if water, dirt and the like penetrate into the inner space 45a through the packings 49 and 57, they do not reach to the reed switch 61, resulting in the prevention of accidental short circuiting of the reed switch 61. For this purpose, the reed switch 61 is secured at both ends thereof to a substrate 63 by soldering, while free ends of lead wires 64 soldered to the substrate 63 are taken out through a grommet 65 to the exterior. The thus assembled substrate 63 is placed in the housing 62 and if necessary, the housing 62 is filled with an insulating resin 66 so as to improve waterproofness and vibration resistance, and thereafter a cover 67 is fitted on the housing 62.

In the above embodiment, the reed switch 61 is used as a pulse generating means, but a Hall element or other pulse generating means can be used.

Moreover, the above embodiments are disclosed above in terms of disposing the revolution detecting device according to the invention between the transmission of the automobile and the speedometer cable, but it is contemplated, of course, that the revolution detecting device can be applied to ordinary industrial machines, agricultural machines and the like.

According to the invention, the revolution of the connection shaft can be detected without trouble even if harmful substances such as water, dirt and the like penetrate into the inner space of the casing for the revolution detecting device, so that the vibration resistance is considerably improved and as a result, the revolution detecting device can not be damaged in use or transmission.

Furthermore, the transmission of rotation can be smoothly achieved even if the eccentricity is caused between the rotation output shaft and the rotation conducting shaft, these shafts being connected to opposite ends of the connection shaft of the revolution detecting device, so that mechanical loss can be reduced considerably and the acceptable degree of the eccentricity can be enlarged. And also, the number of parts to be used can be reduced as compared with the conventional device, so that the improvement of assembling operation and the decrease of cost are achieved.

What is claimed is:

1. A device for detecting the number of revolutions of a connection shaft means, the device comprising a connection shaft means, a permanent magnet body attached to the connection shaft means and a pulse generating means disposed apart from the magnetic body, wherein said pulse generating means is arranged in a housing isolated from a casing containing said connection shaft means; and said connection shaft means comprises a pair of shafts connected in driving relation in said casing radially inboard of said pulse generating means, one said shaft being a hollow outer shaft supported for rotation within said casing, the other shaft being an inner shaft having an end axially received within said hollow shaft, said magnetic body being fixed on a hollow nonmagnetic member sleeved over said hollow shaft at the end of said inner shaft, said outer shaft having means drivingly interconnecting said hollow magnetic member and inner shaft.

2. A device as claimed in claim 1, wherein said housing is filled with an insulator resin.

3. The device of claim 1 in which said drivingly interconnecting means comprises an axially extending groove in said hollow outer shaft, said inner shaft having a radially outward extending protrusion axially receivable in said axially extending groove, said hollow nonmagnetic member having a radially inward extending protrusion received in said axially extending groove in said hollow shaft axially adjacent said radially outward extending protrusion on said inner shaft.

4. A device for detecting the number of revolutions of a connection shaft means, the device comprising a connection shaft means, a permanent magnet body attached to the connection shaft means, and a pulse generating means disposed apart from the magnet body, wherein said pulse generating means is arranged in a housing isolated from a casing containing said connection shaft means, said connection shaft means comprising a first connection shaft having a radially extending protrusion and a second connection shaft having a cylindrical shape capable of receiving said first connection shaft therein and having an axially extended groove capable of engaging said protrusion, said connection shaft means further including a stopper for controlling the depth to which said first connection shaft is insertable in said second connection shaft and a locking member for preventing the slipping apart of said shafts.

5. A device as claimed in claim 4 wherein the interior of said housing is separated from the interior of said casing by a common intervening wall, said pulse generating means being mounted on a substrate which carries lead wires onto said pulse generating means, said substrate being receivable in said housing and coverable with means to fixedly locate same in said housing, said magnet by being annular and sleeved on said second connection shaft and including a stopper extending radially inward into said groove of said second connection shaft to control the depth of entry of said first connection shaft into said second connection shaft, a bearing supporting the free end of said second connection shaft in the portion of said casing remote from said first connection shaft, said first connection shaft having outside diameter less than the inside diameter of the second connection shaft to permit eccentricity between said shafts, a flanged cylindrical member at the end of said casing opposite said bearing and through which said first connection shaft extends, an annular plate fixed to said second connection shaft between said bearing and magnet body, said second connection shaft being held axially within said casing by interference between said annular plate and bearing on the one hand and between the cylindrical flanged member and the adjacent end of said second connection shaft on the other hand, connector means at opposite ends of said casing for fixed connection thereof between devices carrying rotatably driving and driven shafts respectively engageable with said first and second connection shafts.

6. A device for detecting the number of revolutions of a connection shaft means, the device comprising a connection shaft means, a permanent magnet body attached to the connection shaft means, and a pulse generating means disposed apart from the magnet body, wherein said pulse generating means is arranged in a housing isolated from a casing containing said connection shaft means, said connection shaft means comprising a connection shaft which has formed on one end thereof a cylindrical engaging part capable of receiving therein a rotation conducting shaft with a radially extended protrusion, said connection shaft having an axially extended groove capable of engaging said protrusion, said connection shaft having formed on another end thereof a convex curved part having a radially extended protrusion, said connection shaft means including a spherical member supporting said cylindrical engaging part on a bearing.

7. A device as claimed in claim 5 wherein the interior of said housing is separated from the interior of said casing by a common intervening wall, said pulse generating means being mounted on a substrate which carries the lead wires to said pulse generating means, said substrate being receivable in said housing and coverable with means to fixedly locate same in said housing, said magnet being annular and sleeved on said connection shaft and including a protrusion extending radially inward into said groove of said connection shaft to prevent slippage with respect thereto, said bearing supporting the cylindrical engaging part of said connection shaft in one end portion of said casing, a flanged cylindrical member at the other end of said casing remote from said bearing and through which said convex curved part of said connection shaft extends, connector means at opposite ends of said casing for fixed connection thereof between devices carrying rotatably driving and driven shafts respectively engageable with said convex curved part and cylindrical engaging part of said connection shaft, said bearing having a collar for preventing slipping out of said spherical member, said casing having an annular stopper plate sandwiched between one end of said bearing and said magnet to control the axial position of said spherical member and loosely surrounding said connection shaft to permit tilting of said connection shaft about the center of said spherical member to provide a self-aligning effect.

* * * * *

UNITED STATES PATENT OFFICE
CERTIFICATE OF CORRECTION

Patent No. 4,336,517          Dated June 22, 1982

Inventor(s) Kyoji Kobayashi and Takeo Furuya

It is certified that error appears in the above-identified patent and that said Letters Patent are hereby corrected as shown below:

Column 6, line 62; change "magnetic" to ---magnet---.

line 68; change "insulator" to ---insulating---.

Column 7, line 34; change "by" to ---body---.

Column 8, line 24, "claim 5" should read -- claim 6 --;

line 31, after "magnet" insert -- body --

Signed and Sealed this

Eighteenth Day of January 1983

[SEAL]

Attest:

Attesting Officer

GERALD J. MOSSINGHOFF

Commissioner of Patents and Trademarks